Aug. 15, 1939.  W. E. HAUPT  2,169,949
DRIVING AND CONTROL APPARATUS
Filed Jan. 21, 1932    5 Sheets-Sheet 1
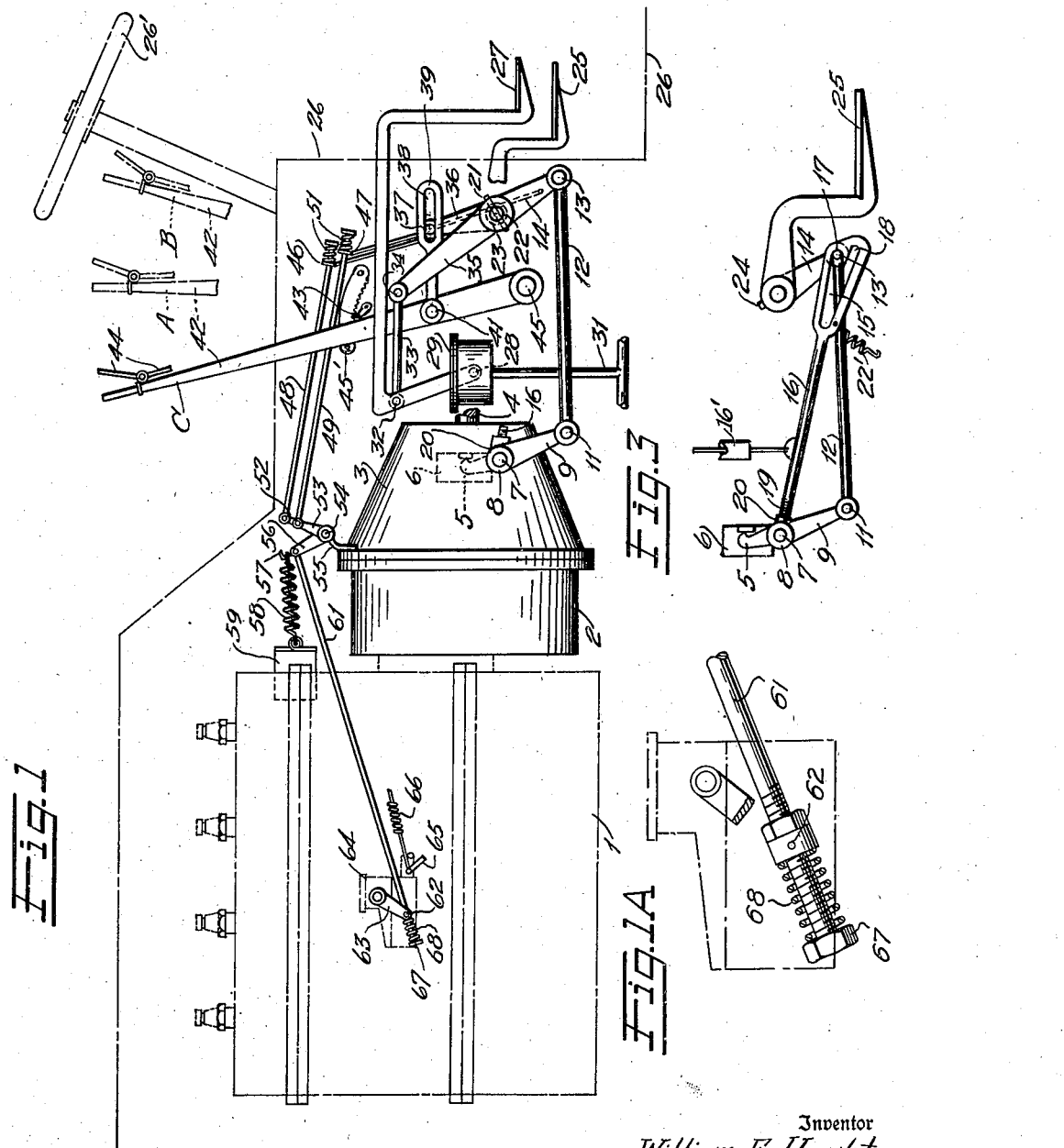
Inventor
William E. Haupt
By
Strauch & Hoffman
Attorneys

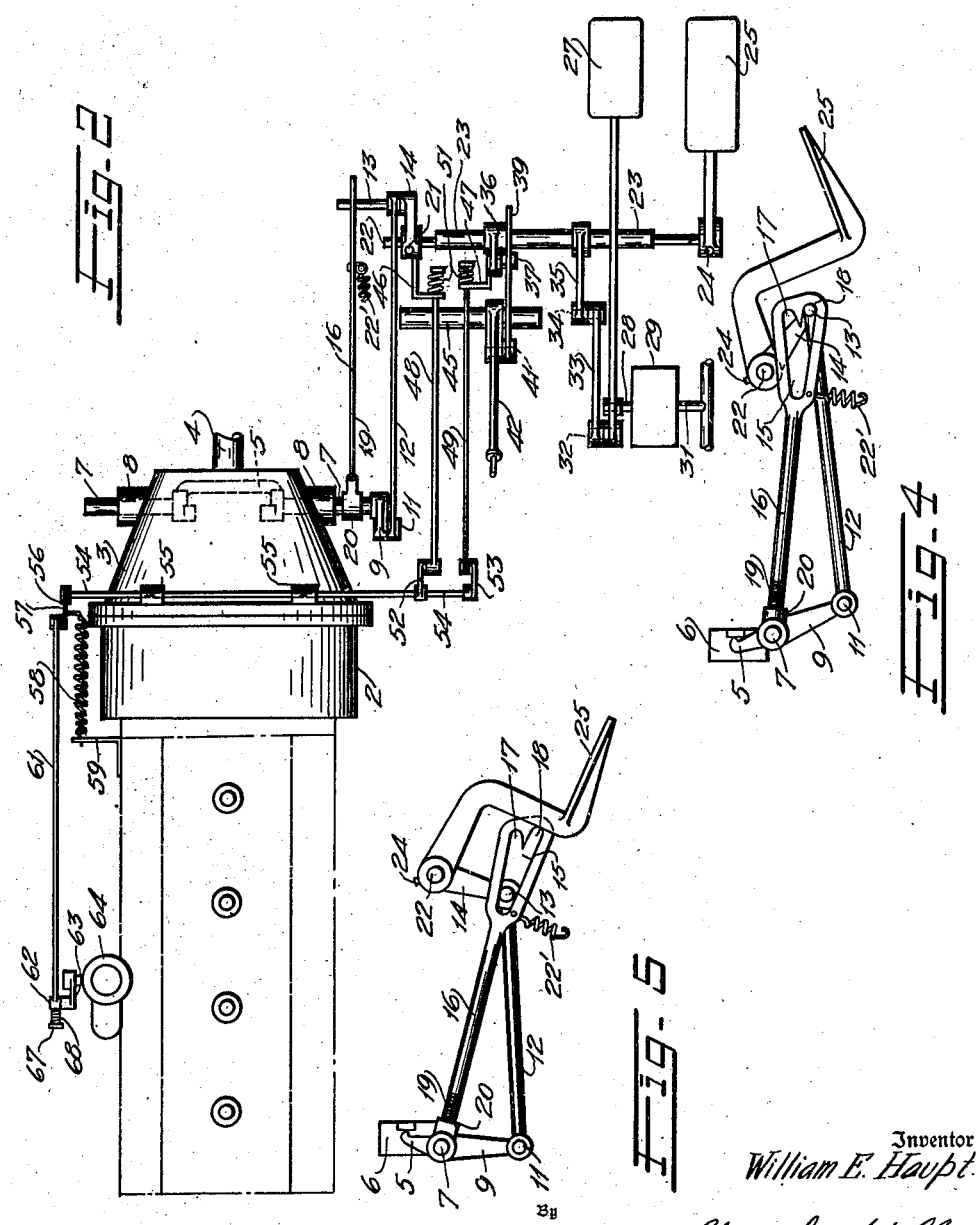

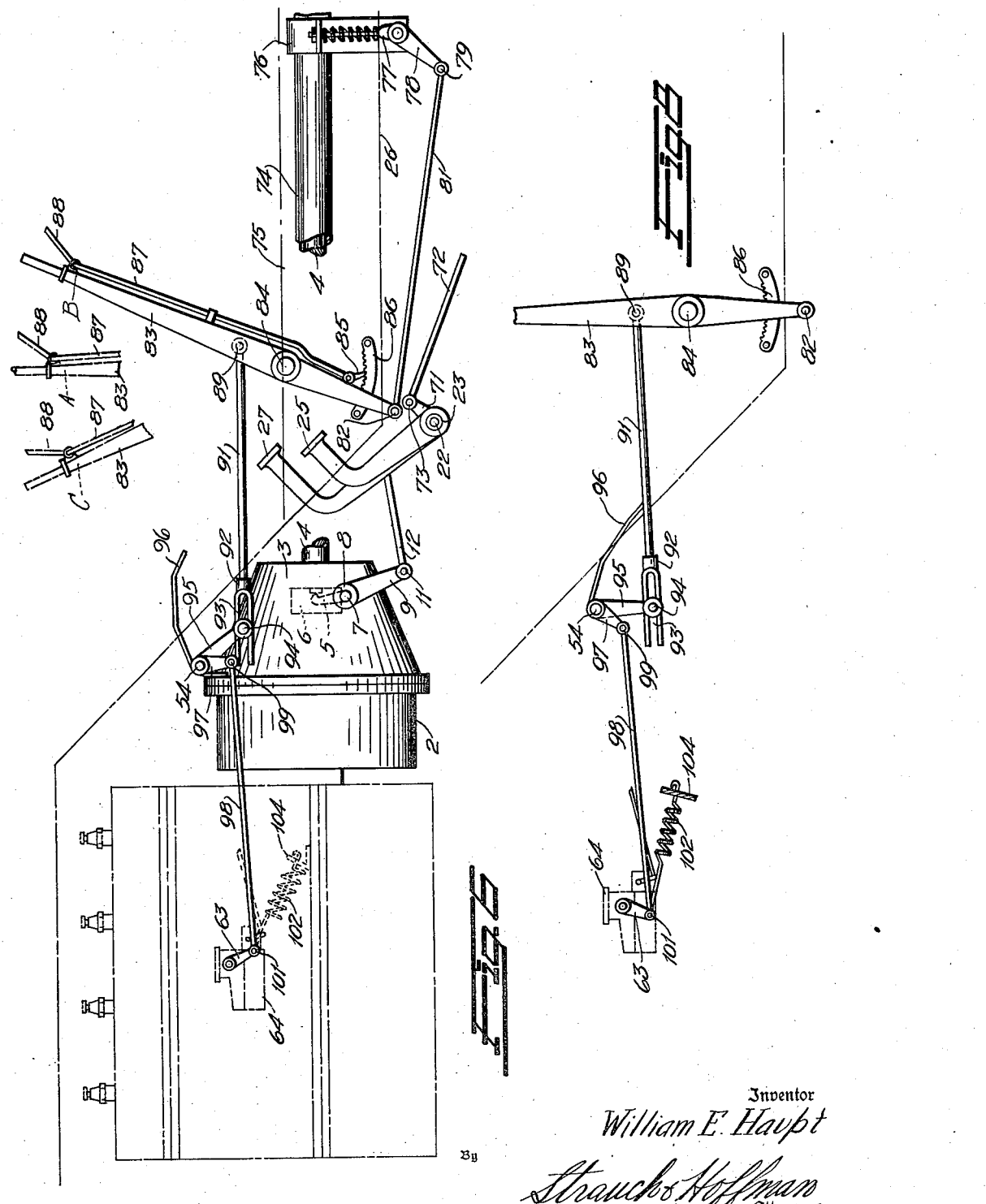

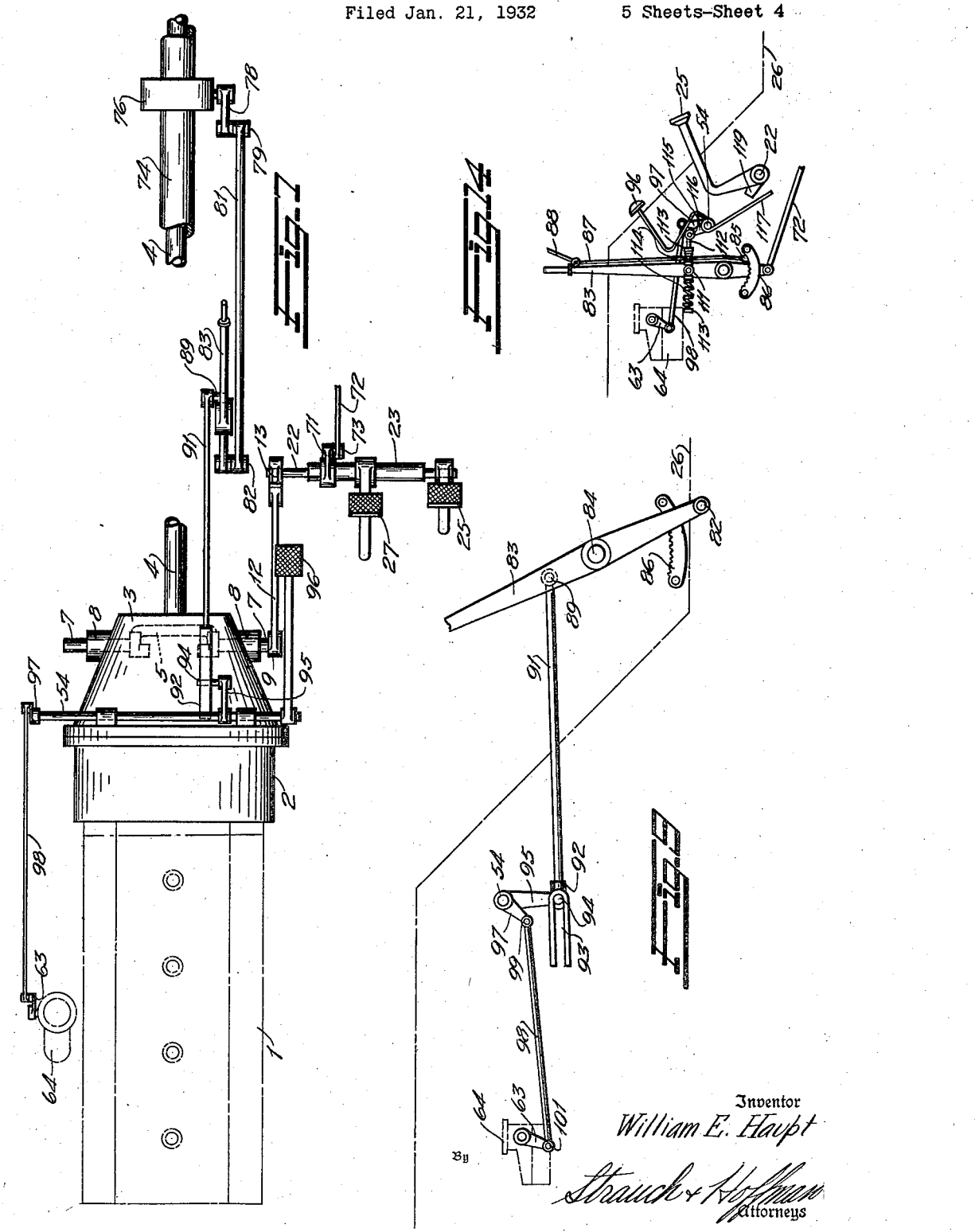

Aug. 15, 1939.    W. E. HAUPT    2,169,949
DRIVING AND CONTROL APPARATUS
Filed Jan. 21, 1932    5 Sheets-Sheet 5

Inventor
William E. Haupt
By
Strauch & Hoffman
Attorneys

Patented Aug. 15, 1939

2,169,949

UNITED STATES PATENT OFFICE 2,169,949

DRIVING AND CONTROL APPARATUS

William E. Haupt, Westville, N. J., assignor to Automatic Drive and Transmission Company, Gloucester City, N. J., a corporation of New Jersey Application January 21, 1932, Serial No. 588,024

4 Claims. (Cl. 192—.01)

The present invention relates to drive and control apparatus, and more particularly to drive and control apparatus utilizing automatic clutch mechanisms. My invention is applicable to the control of various types of stationary industrial power applications such, for example, as the operation of hoist mechanisms, excavating machinery drives, and the like, but in the preferred embodiments of the invention hereinafter set forth arrangements are disclosed especially adapted for the drive and control of delivery vehicles of the type in which a transverse passageway is provided through the body, permitting the operator to readily alight or dismount from the vehicle in which the control elements are disposed in the passageway so as to simplify the starting and stopping of the vehicle under all conditions while the operator is standing or sitting therein.

In United States Patent #1,777,966 granted October 7, 1930, a delivery vehicle is shown including a passageway extending transversely through the body, which passageway is provided with a low floor line enabling the operator of the vehicle to readily mount the vehicle in making the deliveries for which purpose the vehicle was particularly designed. In the operation of vehicles of this character it is desirable that a control arrangement be provided that will enable the operator of the vehicle to expeditiously start, stop and safely govern the vehicle with a minimum of effort all to the end that the vehicle is capable of most efficiently serving the purpose for which it was provided. The prior drives and controls for such vehicles have been inefficient, difficult, and fatiguing to operate, and as a result have caused accidents which are avoidable by utilization of my present invention.

An object of the invention is to provide an efficient arrangement whereby the clutch, forming a part of the driving mechanism of the vehicle, and the throttle control mechanism may be simultaneously operated in proper sequence by a single foot pedal whereby a standing operator can control both clutch and throttle with one foot.

Another object of the invention is to provide a novel vehicle drive and control arrangement operable from standing position in which an automatic clutch forming a part of the driving mechanism of the vehicle, and the vehicle brake and engine throttle mechanisms are interconnected for successive operation either by a single foot pedal conveniently arranged in the vehicle body, or by a hand lever located so that the vehicle may be efficiently stopped by the operator of the vehicle, irrespective of the position that he may occupy, within wide limits, in the vehicle body.

This invention also provides a novel combination control for an automatic clutch braking and throttle mechanism of a throttle controlled power drive, permitting efficient operation of the motor vehicles and various industrial drives from standing or sitting position with a maximum of safety and a minimum of operator's fatigue while at the same time securing increased smoothness and efficiency of operation, and reducing maintenance cost materially.

Still further objects of the invention will appear as the description thereof proceeds with reference to the accompanying drawings in which:

Figure 1 is a diagrammatic side elevation showing the essential parts of my improved drive and control arrangement applied to a vehicle of the stand-drive type.

Figure 1A is a fragmental sectional view of the carburetor throttle connection shown in Figure 1.

Figure 2 is a diagrammatic plan view of the drive and control arrangements shown in Figure 1.

Figures 3, 4 and 5 are fragmental diagrammatic views showing the manual clutch control pedal of the arrangement illustrated in Figures 1 and 2 in automatic driving, positive driving, and in manually declutched position respectively.

Figure 6 is a diagrammatic side elevation with parts omitted showing a modified form of my invention.

Figure 7 is a diagrammatic plan view with parts broken away, of the form of invention shown in Figure 6.

Figure 8 is a fragmental view illustrating the engine controlling throttle opened by the foot accelerator with the emergency brake released and the emergency brake lever in intermediate position in the form of invention illustrated in Figures 6 and 7.

Figure 9 is a fragmental view showing the engine throttle open under control of the emergency brake lever, with the emergency brake released in the form of invention illustrated in Figures 6 and 7.

Figures 12, 13 and 14 are diagrammatic side elevations of the form of invention shown in Figure 11 illustrating different control positions thereof.

Figure 11:
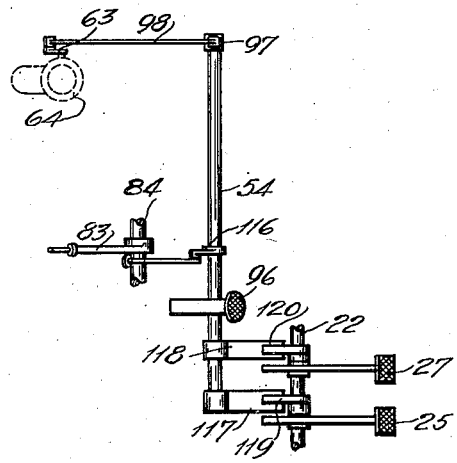
Figure 11 is a diagrammatic plan view of the form of invention shown in Figure 10.

As shown in Figures 1 and 2, the reference character 1 indicates an internal combustion motor of any well known type which is suitably suported in a manner, not shown) in the chassis of a delivery vehicle, for example, the type illustrated in United States Patent #1,777,966.

The motor 1 is provided with a flywheel housing 2 of any well known construction to which is bolted clutch housing 3, within which a centrifugally operated automatic clutch, preferably of the general type illustrated in copending application S. N. 488,757 filed October 15, 1930, is located, and in which a set of centrifugally operated weights are arranged during automatic operation. A clutch of the type referred to and provided with a manual control is disclosed in Patent No. 1,822,716 to H. H. Vail granted September 1, 1931. As will be more fully understood by reference to said copending application or said patent, when engine 1 is operating at or below idling speeds or is at rest in automatic position, the centrifugal clutch operating weights are retracted and cause disengagement of the driving and driven clutch members. When the engine speed increases above idling speed the driving and driven clutch members are brought into engagement with increasing pressures until at operating speeds of the engine at which the maximum torque is developed, the driven shaft 4 leading to the usual multi-speed transmission (not shown) is driven without slippage at engine speeds.

As will be clearly understood by reference to said copending application the driving and driven clutch members may be manually separated independently of the centrifugal weight operation through actuation of clutch throwout yoke 5 which shifts clutch throwout bearing diagrammatically indicated at 6 to retract the driven clutch plate from engagement with the driving clutch plate, thereby disconnecting shaft 4 from the engine 1. The lower end of clutch throwout yoke 5 is rigidly secured to and mounted for rotation with clutch throwout shaft 7 journalled in suitable bearings 8 in clutch housing 3. Rigidly secured to a projecting end of clutch throwout shaft 7 is manual operating clutch lever 9, the lower end of which is connected by means of pivot pin 11 to one end of clutch link 12. The opposite end of clutch link 12 is pivotally secured by means of pin 13 to the lower end of clutch lever 14.

Pin 13 extends into and through opening 15 of the automatic and positive clutch control latch member 16 (Figures 2 to 5) and is adapted to rest in automatic notch 17 or positive notch 18 of latch member 16. Latch member 16 is provided with threaded end 19 by means of which it is adjustably threaded into member 20 rotatably supported on clutch throwout shaft 7. Latch member 16 is urged in a clockwise direction to the position shown in Figures 3 and 5 by means of a coil spring 22', one end of which is connected to the latch member and the other end of which is connected to the vehicle framing (not shown), but may be raised manually to permit pin 13 to enter slot 18 at the will of the operator thereby permitting the parts to assume the position shown in Figure 4.

The upper end of clutch lever 14 is rigidly secured by means of pin 21 to clutch operating shaft 22 which is journalled for rotation in suitable bearings supported from the vehicle framework (not shown) and is rotatable in the hollow brake shaft 23. Secured by means of pin 24 to the left end of the brake shaft 22 is clutch pedal 25, which extends through a suitable slot in the engine housing of the vehicle and is supported above the floor of the vehicle a sufficient distance to permit it to assume the operating positions illustrated in Figures 3, 4 and 5. The engine housing and vehicle floor line are indicated by the dot and dash line 26.

In operation of the clutch mechanisms so far described, with pin 13 in the automatic notch 17, clutch pedal 25 together with the connected clutch operating mechanism in normal position holds clutch operating bearing 6 so that with the engine 1 at rest or operating at or below idling speeds, the driving and driven members of the clutch are separated and the engine is disconnected from the drive shaft 4. When the engine is accelerated from idling speed the centrifugally operating weights of the clutch force the clutch driving and driven members into engagement with increasing pressures, the engine speed being permitted to rise to a point where the engine will develop a substantial torque before a substantial driving couple is effected between the driving and driven clutch members.

With the clutch pedal 25 depressed to the position illustrated in Figure 5, clutch bearing 6 is retracted sufficiently so that independently of the automatic operating mechanism disengagement of driving and driven clutch members is effected, and shift operations of the vehicle transmission mechanism are permitted in the usual manner.

With the clutch pedal lockout latch 16 in the position illustrated in Figure 3 no driving connection can be effected between the engine and the rear wheels of the vehicle at speeds below idling speed of the engine. However, in motor vehicle operation it may become desirable when the engine is cold or the vehicle battery is low, to start the engine by coasting down a hill or by towing the vehicle. In such an event, latch member 16 may be manually raised for example by the Bowden wire device 16' to permit pin 13 to nest in the positive notch 18 causing clutch pedal 25 to assume positive driving position shown in Figure 4. Clutch bearing 6 with related parts will then move forward as illustrated in Figure 4, and as will be apparent from a reference to the copending application or patent the clutch springs will then force the driven and driving clutch members into driving engagement, even though the automatic centrifugal operating mechanism is in fully retracted position. As soon as the engine has been started in this way actuation of pedal 25 will remove pin 13 from slot 18, and spring 22 will then function to restore clutch latch 16, so that on release of the pedal the parts will again assume the automatic operating position shown in Figure 3.

Clutch pedal 25 is disposed at one side of the steering post of vehicle steering wheel 26', and extending into the vehicle body at the other side of the steering wheel post is the service brake foot pedal 27. Foot pedal 27 is supported from and rotatable with brake operating spindle 28 of hydraulic brake master cylinder reservoir 29, operating the hydraulic brake mechanism in well known manner. Cylinder 29 is connected by means of tubing 31 to the hydraulic brake cylinders mounted on the vehicle wheels, of any well known construction. Connected to service brake foot pedal 27 by means of pin 32, is one end of brake link 33, the opposite end of which is connected by means of pin 34 to the upper end of brake lever 35 keyed on and rotatable with hollow shaft 23.

Secured to and rotatable with shaft 23 is another brake lever 36 in the upper end of which a protruding pin 37 is secured. Pin 37 extends through elongated slot 38 of brake link 39, the forward end of which is pivotally connected by means of pin 41 to service brake and throttle hand lever 42. Lever 42 is provided with a latch 43 operated through suitable interconnections by lever 44 in any well known manner. Latch 43 engages the teeth of a ratchet 45' suitably supported in any well known manner from the vehicle framing, to lock lever 42 adjustably in positions selected by the operator. The lower end of lever 42 is pivotally supported by means of shaft 45 in suitable bearings, not shown, supported from the vehicle frame.

In operation of the brake mechanism so far described depression of foot pedal 27 after a predetermined initial free movement determined by adjustment of brake mechanism 29, will cause actuation of the hydraulic brakes in well known manner. While actuation of foot pedal 27 will cause operation of link 33, lever 35, collar shaft 23 and the brake lever 36, the resulting motion of brake lever 36 will move pin 37 in slot 38 producing no effect. When hand lever 42 is moved from the full position, (throttle position C), shown in Figure 1 with brake pedal 27 elevated as shown, the resulting motion of link 39 will cause the end of slot 38 to again engage pin 37 and will rotate lever 36, and shaft 23 actuating link 33 to cause depression of brake pedal 27 and operation of hydraulic brake cylinder mechanism 29 to cause operation of the brake. The brake application commences when lever 42 reaches position A in Figure 1, and application is complete when it reaches position B. It will therefore be seen that the brake cylinder mechanism 29 may be operated either through foot actuation of lever 27 or hand actuation of the lever 42 between positions A and B.

Clutch lever 14 and brake lever 36 are provided with throttle operating extensions 46 and 47 having holes in which throttle control rods 48 and 49 are slidably supported adjacent their rear ends. Interposed between the heads formed on the rear end of rods 48 and 49 and extensions 46 and 47 are compression springs 51 which establish a yielding connection between said rods and extensions.

The forward end of throttle rods 48 and 49 are pivotally connected to the upper ends of throttle operating levers 52 and 53, the lower ends of which are connected to the throttle controlling cross shaft 54 supported from the clutch casing flange or in any other suitable manner from the vehicle frame by means of bearing brackets 55.

Secured to the right end of shaft 54 is the lower end of throttle lever 56 provided with a spring securing extension 57 to which one end of tension spring 58 is secured. The opposite end of spring 58 is secured to a suitable bracket 59 supported from the engine 1 or from the vehicle frame in any suitable manner. Pivotally connected to the upper end of lever 56 is one end of throttle rod 61, the other end of which is slidably supported in a hole formed in extension 62 of throttle operating arm 63. The upper end of arm 63 is connected to the throttle operating shaft of carburetor 64 which supplies fuel mixture to engine 1 in well known manner. Carburetor 64 is provided with the usual choke valve operated by arm 65 and Bowden wire 66 from the vehicle dash.

Interposed between nut 67 on the end of throttle rod 61 and extension 62 of arm 63 is a coil spring 68 which normally holds a stop nut or collar which threaded on rod 61 before its end is introduced into 62 in engagement with extension 62, as more clearly seen in Figure 1A.

In the position of parts shown in Figure 1, with hand lever 42 in forward position and clutch and brake pedals 25 and 27 released throttle extensions 46 and 47 of brake and clutch levers 14 and 36 respectively will be in forward position and spring 58 will be contracted, thus holding the throttle of carburetor 64 in wide open position. The brake mechanism is so adjusted that until lever 42 is in intermediate position indicated by the dot and dash line position A of lever 42 in Figure 1, no braking operation of cylinder 29 will occur, and in position B of lever 42 full brake application will be secured. Between positions A and C the motion of lever 42, connected lever 36, and throttle operating extension 47 is such that spring 58 will become effective to operate the throttle of carburetor 64 from closed to full open position. Accordingly to control the speed of the vehicle the operator of the vehicle sets lever 42 in the desired position between the closed position A and open throttle position C illustrated in Figure 1, setting extension 47 in a position to give the desired throttle opening, in which position the throttle will be held so long as the clutch and brake pedals 25 and 27 are released. To retard the vehicle speed either brake pedal 27 or the clutch pedal 25 may be depressed by the operator to retract throttle operating extension 46 or 47 and rod 48 or 49 to rotate lever 52 or 53 and the throttle controlling shaft 54, together with the connected lever 56 in a clockwise direction in Figure 1, thereby closing the throttle and applying the brakes, manually declutching the clutch driving and driven members. It will therefore be seen that when either the clutch or the brake pedal is depressed, the engine throttle will be closed and cannot again be opened until both the clutch and brake pedals are released, and control lever 42 is moved forward from the intermediate position A towards open throttle position C.

With the hand lever 42 in intermediate position A and clutch pedal 25 in released position shown in Figure 2 or with pedal 25 or 27 depressed the throttle will be closed, the engine speed will drop to idling, and the automatic clutch mechanism will disengage the clutch driving member from the clutch driven member until the engine speed is again accelerated by opening of the throttle to speed the engine above idling speed. In traffic, the operator can therefore set hand lever 42 to give the desired maximum vehicle speed and when he desires to slow the vehicle speed or stop for traffic, all that will be required is depression of the brake pedal 27 to close the throttle and apply the brakes. If the vehicle slows down to a speed corresponding to the idling speed of the engine the clutch will automatically release, and the vehicle may be brought to a full stop by brake application or speed may be immediately picked up by release of the brake pedal with resultant immediate opening of the throttle. With the vehicle stopped the engine will be operating at idling speed, and upon release of the brake pedal the throttle will immediately be opened the desired amount and as the engine speeds up the clutch disclosed in said pending application and patent will pick up the vehicle in high gear under normal operating conditions without the necessity of shifting. Where a quick pick-up is desired or the vehicle is stopped on a hill too steep to permit pick-up of the vehicle in high gear, as soon as the automatic clutch release occurs the operator can shift into a lower gear and when the brake is released, thus opening throttle, the vehicle will pick up very rapidly and smoothly.

After such an operation, to again get into high gear or direct drive quickly, the operator may depress clutch pedal 25 in the usual manner to manually disengage the clutch, which also closes the throttle, and shift in the usual manner. As soon as the clutch pedal is released the throttle, (which closed on depression of the clutch pedal), will again open to the predetermined position.

When the driver desires to stop for the purpose of making a delivery, all that he need do is move lever 42 from open throttle position to the position B. As lever 42 reaches intermediate position A the throttle will be fully closed, and on further clockwise movement the brake will be applied. As the engine drops to idling speed the automatic clutch will effect disconnection of the engine from the driven shaft and the vehicle comes to rest with the engine operated at idling speeds. The driver can immediately leave the vehicle to make a delivery and when he returns all that he need do to start the vehicle is to adjust hand lever 42 forward of the intermediate position a sufficient amount to set the throttle for the desired speed of the vehicle. As the throttle opens the engine will speed up and the automatic clutch will engage in the manner above set forth.

Figures 6 to 9 inclusive, show a modified form of vehicle control adapted for operation with equal facility from standing position or from sitting position. In this form of invention the engine and combination automatic and manual clutch and control constructions are similar to those disclosed in Figures 1 to 5. Like reference characters have been employed to indicate like parts on the drawings and for a full understanding of the parts of this form of invention, not hereinafter described in detail, reference may be had to the foregoing description.

In this form of invention the throttle control connection to the clutch and brake operating mechanism is eliminated and brake pedal 27 is directly keyed to hollow brake operating shaft 23 which is rotatably mounted on the clutch operating shaft 22 in the manner hereinafter set forth. Mechanical brakes are operated by hollow shaft 23 through brake operating arm 71 keyed thereto, and to the upper end of which the service brake rod 72 is pivotally connected by means of pin 73. Service brake rod 72 operates mechanical service brakes, for example of the well known Ford type. In this form of invention the shaft 4 extends through a torque tube 74 above the level of floor 26 and is housed by a suitable tunnel 75 as illustrated in United States Patent 1,777,966. Emergency brake structure 76 supported by torque tube 74 is provided for propeller shaft 4. Brake 76 is operated through cam 77, in turn actuated by emergency brake operating arm 78 in well known manner. Arm 78 is pivotally connected at 79 to the rear end of emergency brake rod 81, the forward end of which is pivotally connected by means of pin 82 to the lower end of emergency hand brake and hand throttle lever 83. Lever 83 is pivotally supported on shaft 84 from the vehicle framework by suitable brakes, (not shown) and is provided with a latch 85 adapted to engage the teeth of locking quadrant 86 suitably supported from the vehicle framework to lock lever 83 adjustably in selected position. Latch 85 is operated by rod 87, in turn actuated by handle 88 pivotally supported adjacent the upper end of hand lever 83 in well known manner.

Pivotally connected by means of pin 89 to lever 83 is the rear end of adjustable throttle control rod 91, the forward end of which is threaded into throttle actuating member 92. Formed in member 92 is slot 93. Slidably projecting into slot 93 is throttle operating pin 94 rigidly secured in the lower end of throttle operating lever 95. The upper end of throttle operating lever 95 is keyed to throttle operating shaft 54.

Secured to the left end of throttle operating shaft 54 is a foot operating pedal or accelerator lever 96 and secured to the opposite end of cross-shaft 54 is throttle operating arm 97, the lower end of which is connected to throttle operating link 98 by means of a pin 99. The forward end of link 98 is secured by means of pin 101 to the lower end of throttle operating arm 63. Throttle arm 63 in this form of the invention is urged toward closed throttle position by a coiled spring 102, one end of which is connected to the lower end of arm 63, the other end of which is connected to a bracket 104 of any suitable type supported from the vehicle.

With the parts in the position shown in Figure 6, the emergency brake is applied and the throttle is in closed position. With the engine either at rest or operating at idling speeds the automatic clutch mechanism will be retracted and the clutch driving and driven members will be disengaged.

When it is desired to drive the vehicle from sitting position in the usual manner lever 83 is moved to the position A illustrated by the dot and dash lines in Figure 6, and shown in full lines in Figure 8, in which position of parts the emergency brake is released and the throttle is under sole control of foot accelerator 96. When it is desired to operate the vehicle from standing position, hand lever 83 is moved from intermediate position A toward the position C illustrated in Figure 6 by the dot and dash line and in Figure 9 by the full line position. As hand lever 83 is moved forward of intermediate position A the end of slot 93 will engage pin 94 and will rock shaft 54 in a clockwise direction to open the throttle of carburetor 64 an amount depending upon the position of lever 83 forward of neutral position. When driving in standing position or in sitting position, the usual manual declutching shift and braking operations may be performed by actuation of clutch pedal 25 and brake pedal 27 in well known manner.

When the driver desires to stop the vehicle to make a delivery lever 83 is moved in a clockwise direction retracting throttle control member 92 and permitting spring 102 to first close the throttle of carburetor 64 after which continued movement of lever 83 will apply the emergency brake bringing the vehicle to a stop. When the engine speed reaches idling speed the automatic clutch mechanism will cause disengagement of the driving and driven clutch members and the vehicle will be brought to rest. Upon re-entering the vehicle by moving lever 83 forward the emergency brake will first be released and thereafter the vehicle throttle will be opened, the engine will speed up, causing the automatic clutch mechanism to force the clutch driving and driven members into engagement in the manner above set forth.

In the form of invention shown in Figures 10 to 13 inclusive a further modified form of invention is disclosed especially applicable to standing and sitting drive controls.

In this form of invention the engine clutch and brake mechanisms of Figures 6 to 9 inclusive, may be utilized. Like characters have been applied to parts similar to those illustrated in connection with the forms of invention heretofore described, and for a full understanding of such parts reference may be had to the foregoing description thereof.

In this form of invention pivotally connected to brake and throttle lever 83 is a member 111 provided with a guide hole in which throttle control rod 112 is slidably supported. The end of rod 112 is threaded to receive nuts 113 to which the outer ends of tension springs 114 surrounding rod 112 are secured. The inner ends of springs 114 are secured to member 111, thereby forming a two-way yielding motion transmitting connection between rod 112 and hand lever 83. The rear end of rod 112 is connected by means of pin 115 to the upper end of lever 116, the lower end of which is supported on and keyed to throttle cross shaft 54. Keyed to the end of cross shaft 54 are the clutch and brake cam arms 117 and 118 respectively, the lower ends of which are held in engagement with cams 119 and 120, respectively. Cams 119 and 120 are secured to and rotatable with clutch pedal 25 and brake pedal 27 respectively.

Figure 12:
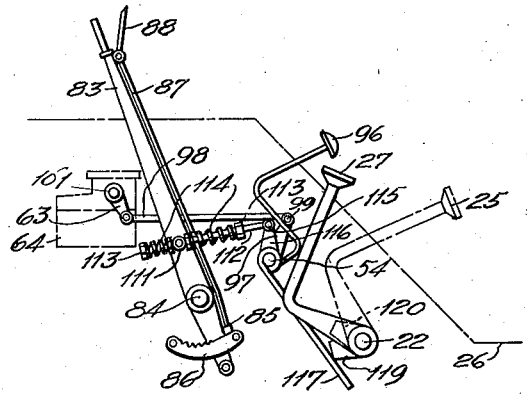
Figure 10:
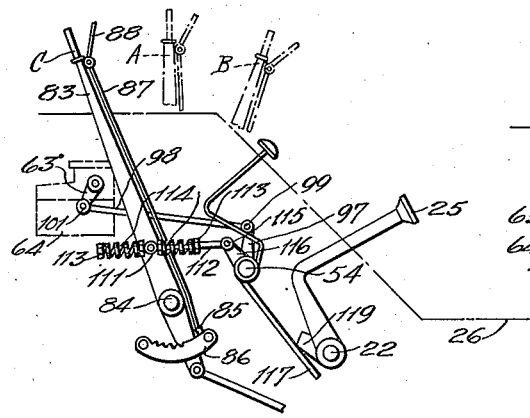
Figure 10 is a diagrammatic side elevation with parts omitted of a further modified driving and control arrangement embodying my invention.
Figure 13:
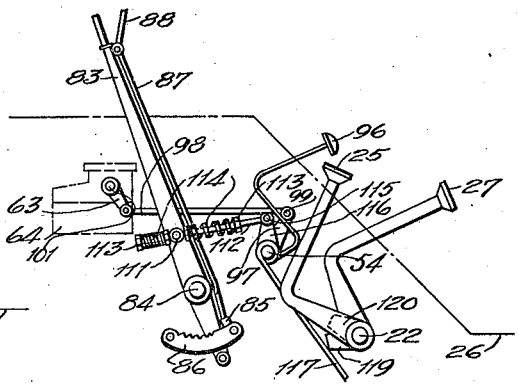

In this form of invention it will be noted that quadrant 86 is provided with a friction locking section for throttle control, and the ratchet tooth locking section in brake control position. The operation of this form of invention is similar to the operation described in detail in connection with Figures 1 to 5. With hand lever 83 in intermediate position A indicated in Figure 10 by the dot and dash lines and as shown in full lines in Figure 14, the emergency brake is released. With pedals 25 and 27 released the throttle may be controlled at the will of the operator through foot accelerator 96, movements of rod 112 being freely permitted by springs 114. In driving from standing position with pedals 25, 27 and 96 released lever 83 may be advanced from intermediate position A in Figure 10 toward position C the amount necessary to give the desired throttle opening through the action of spring 114 on throttle control rod 112 in obvious manner. When clutch pedal 25 or brake pedal 27 are depressed for control purposes, cam 119 or cam 120, as the case may be, will engage cam arms 117 or 118 and will forcibly rotate them in a clockwise direction in Figure 10, moving the throttle arm 63 forcibly to and holding it in closed throttle position as illustrated in Figures 12 and 13, even though lever 83 is set in open throttle position, closing of the throttle being permitted by springs 114. So long as either the clutch pedal 25 or brake pedal 27 is depressed cam 119 or 120 will prevent opening of the throttle as shown in Figures 10, 12 and 13, and the throttle cannot be opened until both pedals 25 and 27 are in released position. In addition to providing an efficient and convenient standing drive control with all of the advantages set forth in connection with Figures 1 to 5 inclusive, abuse of the automatic clutch by depressing the clutch pedal, racing the engine, and then releasing the clutch is prevented.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. In a delivery vehicle of the kind that includes an automatic clutch released when the engine reaches idling speeds and passageway extending across the body; vehicle control elements accessible from said passageway comprising a clutch controlling foot pedal, a brake controlling foot pedal, a fuel controlling foot pedal and a brake controlling hand lever; and fuel controlling connections actuated by each of said foot pedals and said hand lever and operative to feed fuel to the vehicle engine only when said brake and clutch controlling pedals are in released position.

2. Vehicle drive and control mechanism comprising an internal combustion engine; a controlling throttle for said engine; an automatically operable clutch driven by said engine; vehicle drive means driven by said clutch; a manually operable foot pedal controlling said clutch; a brake controlling hand lever; means controlled by said hand lever controlling the opening of said throttle; means to cause closing of said throttle regardless of the position of said hand lever when said foot pedal is depressed, and a foot accelerator control operative to open said throttle only when said foot pedal is released.

3. Vehicle drive and control mechanism comprising an internal combustion engine; a controlling throttle for said engine; an automatically operable clutch driven by said engine; vehicle drive means driven by said clutch; a brake controlling foot pedal; a brake controlling hand lever; means controlled by said hand lever operative to control the opening of said throttle; means to cause closing of said throttle regardless of the position of said hand lever when said foot pedal is depressed, and a foot accelerator control for said throttle operative to open said throttle only when said foot pedal is released.

4. Vehicle drive and control mechanism comprising an internal combustion engine; a controlling throttle for said engine; an automatically operable clutch driven by said engine; vehicle drive means driven by said clutch; a manually operable foot pedal controlling said clutch; a brake controlling foot pedal; a brake controlling hand lever; means controlled by said hand lever operative to control the opening of said throttle; means to cause closing of said throttle regardless of the position of said hand lever when either of said foot pedals is actuated, and a foot accelerator control for said throttle operable to open said throttle only when said foot pedals are released.

WILLIAM E. HAUPT.